(12) United States Patent
Kim et al.

(10) Patent No.: US 8,503,475 B2
(45) Date of Patent: Aug. 6, 2013

(54) RANDOM ACCESS METHOD BASED ON NUMBER OF MESSAGES

(75) Inventors: Kyung Soo Kim, Daejeon (KR); Dong Seung Kwon, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 334 days.

(21) Appl. No.: 12/964,274

(22) Filed: Dec. 9, 2010

(65) Prior Publication Data

US 2011/0134779 A1    Jun. 9, 2011

(30) Foreign Application Priority Data

Dec. 9, 2009   (KR) .................. 10-2009-0121973
Jul. 29, 2010   (KR) .................. 10-2010-0073630

(51) Int. Cl.
H04L 12/43    (2006.01)
H04W 4/00    (2009.01)
H04J 3/24    (2006.01)

(52) U.S. Cl.
USPC ..................... 370/461; 370/329; 370/473

(58) Field of Classification Search
USPC ............ 370/445, 447, 448, 470, 473, 328, 370/329, 468, 337, 345, 461, 347, 321
See application file for complete search history.

(56) References Cited

U.S. PATENT DOCUMENTS

| 7,924,866 B2 * | 4/2011 | Tong et al. ............. 370/437 |
| 8,098,645 B2 * | 1/2012 | Yee et al. ............. 370/345 |
| 8,121,145 B2 * | 2/2012 | Hafeez et al. ............. 370/461 |
| 2010/0142470 A1 | 6/2010 | Park et al. |
| 2010/0272052 A1 | 10/2010 | Kim et al. |

FOREIGN PATENT DOCUMENTS

| KR | 10-2009-0016402 | 2/2009 |
| KR | 10-2009-0063141 | 6/2009 |

* cited by examiner

*Primary Examiner* — Hanh N Nguyen
(74) *Attorney, Agent, or Firm* — Staas & Halsey LLP

(57) ABSTRACT

A base station calculates the number of terminals which have transmitted messages at ith frame, and calculates the number of messages to be transmitted at (i+1)th frame by using the number of terminals which have transmitted the messages in the ith frame. The base station calculates a transmission probability by using the number of messages to be transmitted in the (i+1)th frame and the number of random access slots, and transmits the number of messages to be transmitted in the (i+1)th frame and the transmission probability to the plurality of terminals. The base station receives a message transmitted by a pertinent terminal, whose number of messages to be transmitted in the (i+1)th frame is greater than the number of random access slots, among the plurality of terminals, according to the result obtained by comparing the transmission probability and a random number.

10 Claims, 3 Drawing Sheets

RANDOM ACCESS METHOD BASED ON NUMBER OF MESSAGES

CROSS-REFERENCE TO RELATED APPLICATION

This application claims priority to and the benefit of Korean Patent Application No. 10-2009-0121973 and 10-2010-0073630 filed in the Korean Intellectual Property Office on Dec. 9, 2009 and Jul. 29, 2010, the entire contents of which are incorporated herein by reference.

BACKGROUND OF THE INVENTION (a) Field of the Invention

The present invention relates to a random access method based on the number of messages and, more particularly, to a random access method based on the number of messages transmitted per frame.

(b) Description of the Related Art

In general, a mobile wireless system performs uplink random access by using a binary exponential backoff (BEB) scheme. A collision generated in performing uplink random access is resolved based on an initial backoff window and a maximum backoff window controlled by a base station.

In the mobile wireless system, a terminal that wants to request a bandwidth detects the values of the initial backoff window and the maximum backoff window from an uplink channel descriptor (UCD) message. In this case, the values of the initial backoff window and the maximum backoff window indicate the multiplier of 2. For example, when a value detected from the UCD message is 4, the initial backoff window is 0 and the maximum backoff window is 15, so the backoff window has values between 0 and 15, and when a value detected from the UCD message is 10, the initial backoff window is 0 and the maximum backoff window is 1024, so the backoff window has values between 0 and 1024.

Acquiring the values of the backoff window in this manner, the terminal randomly selects one of the values of the backoff window. Here, the value selected by the terminal refers to the number of slots at a contention interval to be transmitted by the terminal before the terminal transmits a bandwidth request message. After transmitting the bandwidth request message, the terminal waits to receive a bandwidth permission message from a continued MAP.

When the bandwidth permission message is received, the terminal terminates the bandwidth requesting procedure. However, if the bandwidth permission message fails to be received within a predetermined time, the terminal determines that the bandwidth request procedure has failed. And, the terminal increases the backoff window by a certain multiple within a range in which the backoff window does not exceed the maximum backoff window. When the bandwidth request is not successful in spite of the fact that the process is attempted by a maximum repeated number of times, the terminal discards a corresponding protocol data unit.

In this manner, the collision solution in case of using the related art BEB scheme is controlled by a base station and is performed irrespective of the number of uplink random accesses, which results in problems in that the probability of the collision of the uplink random accesses increases depending on the number of terminals that perform the uplink random access request and an uplink access delay increases.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a random access method based on the number of messages having advantages of uniformly maintaining a collision probability and an uplink access delay generated in performing uplink random access, regardless of an uplink random access load, and allowing terminals to preferentially access an uplink according to their service class after their initial accessing a base station.

An exemplary embodiment of the present invention provides a random access method based on the number of messages of a base station, including:

calculating the number of terminals which have transmitted a message, respectively, at ith frame; calculating the number of messages to be transmitted at (i+1)th frame by using the number of terminals which have transmitted the message, respectively, in the ith frame; calculating a transmission probability by using the number of messages to be transmitted in the (i+1)th frame and the number of random access slots; transmitting the number of messages to be transmitted in the (i+1)th frame and the transmission probability to a plurality of terminals; and receiving a message transmitted by at least one terminal among the plurality of terminals, according to the result obtained by comparing the transmission probability and a random number, when the number of messages to be transmitted in the (i+1)th frame is greater than the number of random access slots.

Another embodiment of the present invention provides a method for performing random access by a plurality of terminals based on the number of messages, including:

receiving a the number of messages to be transmitted at (i+1)th frame and a transmission probability calculated by using the number of messages to be transmitted at (i+1)th frame and the number of random access slots from a base station; comparing the number of messages to be transmitted in the (i+1)th frame and the number of random access slots; when the number of messages to be transmitted in the (i+1)th frame is greater than the number of random access slots, extracting a random number; and determining whether to transmit the messages according to the result obtained by comparing the random number and the transmission probability.

DETAILED DESCRIPTION OF THE EMBODIMENTS

Figure 1:
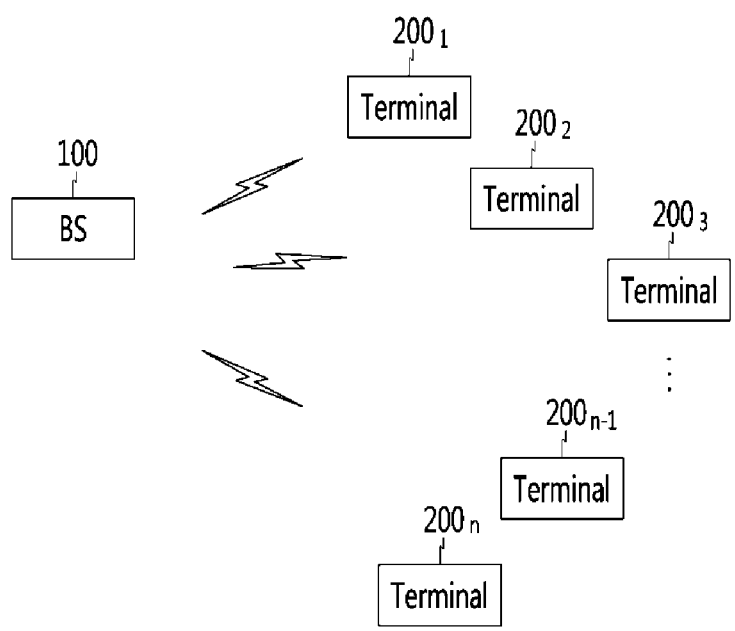
FIG. 1 is a schematic view illustrating a mobile wireless system environment according to an exemplary embodiment of the present invention.

In the following detailed description, only certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

FIG. 1 is a schematic view illustrating a mobile wireless system environment according to an exemplary embodiment of the present invention.

As shown in FIG. 1, a mobile wireless system environment according to an exemplary embodiment of the present invention includes a base station 100 and terminals $200_1$-$200_n$.

The base station 100 controls a collision of the terminals $200_1$-$200_n$ generated in performing uplink random access by using a binary exponential backoff (BEB) scheme. When the terminals $200_1$-$200_n$ request bandwidth, the base station 100 transmits the number of messages to be transmitted at a next frame and a transmission probability to the terminals $200_1$-$200_n$, thus preventing a transmission collision. Here, the transmission probability will be described later.

The terminals $200_1$-$200_n$ receive the number of messages to be transmitted in the next frame and the transmission probability from the base station 100. The terminals $200_1$-$200_n$ then determine whether to perform uplink random access by using the number of messages to be transmitted in the next frame and the transmission probability and control a message transmission, respectively.

A random access method based on the number of messages transmitted per frame according to an exemplary embodiment of the present invention will now be described in detail.

A random access method using that the average of the numbers of bandwidth request messages is maximized when the number ($n_{opt}$) of optimum bandwidth request messages per frame and the number (N) of random access slots per frame are equal on the assumption that ($ñ_i$) is the number of messages to be transmitted at ith frame, ($n_i$) is the number of terminals which have transmitted messages at ith frame, and Pi is the probability that each message is transmitted in the ith frame, according to the present exemplary embodiment will now be described.

The base station 100 calculates the number ($ñ_{i+1}$) of messages to be transmitted in the (i+1)th frame by using the number ($ñ_{i+1}$) of messages to be transmitted in the (i+1)th frame, the messages ($ñ_i(1-p_i)$) which have failed to be transmitted in the ith frame, messages ($n_i-c_{1,i}$) which have been transmitted in the ith frame but their transmissions were not successful, and messages ($n_{a,i+1}$) which newly arrive in the (i+1)th frame by using Equation 1 shown below:

$$ñ_{i+1}=ñ_i(1+p_i)+n_i-c_{1,i}+n_{a,i+1} \quad \text{(Equation 1)}$$

In this case, the base station 100 knows about only the number $C_1$ of successfully transmitted slots per frame and does not know about the number $C_0$ of empty slots per frame. Thus, in the present exemplary embodiment, the number ($n_i$) of terminals which have transmitted messages in the ith frame is calculated based only on the number $C_1$ of successfully transmitted slots per frame by using Equation 2 to Equation 10.

$$B_{n,1/N}(r) = \binom{n}{r}\left(\frac{1}{N}\right)^r\left(1-\frac{1}{N}\right)^{n-r} \quad \text{(Equation 2)}$$

Here, r is the number of bandwidth request messages transmitted on one slot, n is the number of terminals, and N is the number of random access slots per frame.

In case in which one frame uses N number of random access slots in requesting bandwidth, when the n number of terminals $200_1$-$200_n$ transmit a bandwidth request message, respectively, a parameter of the number (r) of the bandwidth request messages transmitted on one slot follows a binomial distribution of the number (n) of the terminals and 1/N.

Equation 2 is applied to all the N number of random access slots, so the average ($a_r^{N,n}$) of the slots having the number (r) of the bandwidth request message transmitted on one slot is obtained to be expressed by Equation 3 shown below:

$$a_r^{N,n} = NB_{n,1/N}(r) = N\binom{n}{r}\left(\frac{1}{N}\right)^r\left(1-\frac{1}{N}\right)^{n-r} \quad \text{(Equation 3)}$$

Meanwhile, the distribution of a random variable ($c_r$) indicating the number of slots accurately having the r number of bandwidth request messages is expressed by Equation 4 shown below:

$$P(c_r = m_r) = \frac{\binom{N}{m_r}\prod_{k=0}^{m_r-1}\binom{n-kr}{r}G(N-m_r, n-rm_r)}{N^n} \quad \text{(Equation 4)}$$

Here, G(M, m) is expressed by Equation 5 shown below:

$$G(M, m) = M^m + \sum_{k=1}^{\lfloor m/r \rfloor}\left\{(-1)^k\prod_{j=0}^{k-1}\left\{\binom{m-jr}{r}(M-j)(M-k)^{m-kr}\frac{1}{k!}\right\}\right\} \quad \text{(Equation 5)}$$

When only one bandwidth request message is transmitted in each slot, the bandwidth request message can be successfully transmitted, so a probability distribution of the number ($c_1$) of the bandwidth request messages successfully transmitted in one frame is when r is 1 in Equation 4, which can be expressed by Equation 6 shown below:

$$P(\mu_1 = m_1) = \frac{\binom{N}{m_1}\prod_{k=0}^{m_1-1}\binom{n-k}{1}G(N-m_1, n-m_1)}{N^n} \quad \text{(Equation 6)}$$

Here, G(M, m) is expressed by Equation 7 shown below:

$$G(M, m) = \quad \text{(Equation 7)}$$

-continued $$M^m + \sum_{k=1}^{m} \left\{ (-1)^k \prod_{j=0}^{k-1} \left\{ (m-j)(M-j)(M-k)^{m-k} \frac{1}{k!} \right\} \right\}$$

When the number of bandwidth request messages transmitted per frame is $n_1$, a transmission probability $[P(c_1=m_1|n=n_1)]$ that the number $c_1$ of bandwidth request messages successfully transmitted in one frame is the number $(m_1)$ of successful bandwidth request message can be calculated by substituting $n_1$ to n in Equation 6. Thus, when the number $(c_1)$ of the bandwidth request messages successfully transmitted in one frame is given, the probability that n becomes $n_1$ can be calculated by using Bayesian Theorem, which can be expressed by Equation 8.

$$P(n = n_1 \mid \mu_1 = m_1) = \qquad \text{(Equation 8)}$$
$$\frac{P(n = n_1, \mu_1 = m_1)}{P(\mu_1 = m_1)} = \frac{P(\mu_1 = m_1 \mid n = n_1)P(n = n_1)}{\sum_{n_1=m_1}^{\infty} P(\mu_1 = m_1 \mid n = n_1)P(n = n_1)}$$

In order to calculate the probability that when the number of successfully transmitted bandwidth request messages is $m_1$, the number of transmitted bandwidth request messages is $n_1$ by using Equation 8, the probability $[P(n=n_1)]$ that the number of bandwidth request messages transmitted per frame is $n_1$ must be calculated.

In detail, on the assumption that the number $(n_s)$ of terminals waiting to request bandwidth in each frame follows the Poisson distribution having an average of N, the optimum number of bandwidth request messages per frame is when it is equal to the number (N) of the random access slots per frame. Thus, when it is controlled such that N number of bandwidth request messages are transmitted on average, the probability $[P(n=n_1)]$ follows such a distribution as expressed by Equation 9 shown below:

(Equation 9)

$$P(n = n_1) = \sum_{n_s = n_1}^{\infty} P(n = n_1 \mid n_s) P(n_s) =$$

$$\begin{cases} \dfrac{e^N N^{n_1}}{n_1!} + \sum_{n_s = min(n_1, 50)}^{\infty} \dfrac{e^N N^{n_s}}{n_s!} \binom{n_s}{n_1} \left(\dfrac{N}{n_s}\right)^{n_1} \left(1 - \dfrac{N}{n_s}\right)^{n_s - n_1} & \text{if } n_1 < N \\ \sum_{n_s = min(n_1, 50)}^{\infty} \dfrac{e^N N^{n_s}}{n_s!} \binom{n_s}{n_1} \left(\dfrac{N}{n_s}\right)^{n_1} \left(1 - \dfrac{N}{n_s}\right)^{n_s - n_1} & \text{otherwise} \end{cases}$$

Here, when the number $(n_s)$ of terminals waiting to request bandwidth is smaller than N, all the bandwidth request messages can be transmitted, so $P(n=n_1|n_s)$ indicates the probability of $P(n_s=n_1)$. $P(n_s)$ indicates the probability of transmission of the number $(n_1)$ of the bandwidth request messages transmitted per frame according to the binomial distribution when the number (ns) waiting to request bandwidth is N or greater.

With $P(n=n_1|c_1=m_1)$ obtained by Equation 8, when the number $(c_1)$ of bandwidth request messages successfully transmitted in one frame is given as the number $(m_1)$ of the successful bandwidth request messages, the number (n) of transmitted bandwidth request messages may be determined as the value of the number $(n_1)$ of the bandwidth request messages transmitted per frame enabling $P(n=n_1|c_1=m_1)$ to be maximized as follows, and the number (n) of bandwidth request messages can be expressed by Equation 10 shown below:

$$n = \max_{n_1} P(n = n_1 \mid c_1 = m_1) \qquad \text{(Equation 10)}$$

Figure 2:
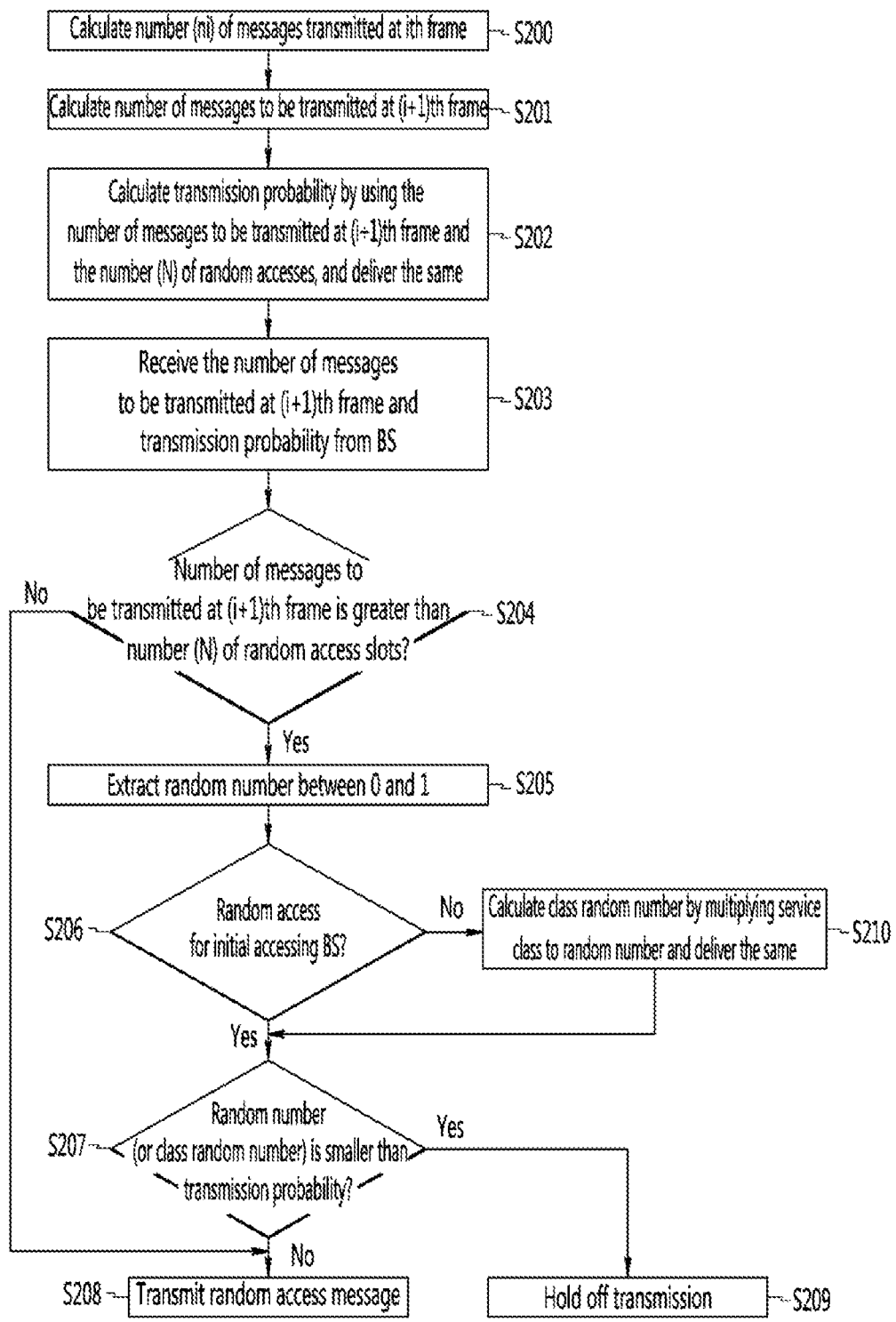
FIG. 2 is a flow chart illustrating the process of a random access scheme in the mobile wireless system illustrated in FIG. 1.

FIG. 2 is a flow chart illustrating the process of a random access scheme in the mobile wireless system illustrated in FIG. 1.

With reference to FIGS. 1 and 2, the base station 100 calculates the number $(n_i)$ of terminals which have transmitted messages in the ith frame by using Equation 2 to Equation 10 (S200). The base station 100 then calculates the number $(\tilde{n}_{i+1})$ of messages to be transmitted in the (i+1)th frame by applying the number $(n_i)$ of the terminals which have transmitted messages in the ith frame to Equation 1 (S201).

The base station 100 calculates the transmission probability $(p_{i+1}=N/\tilde{n}_{i+1})$ by using the number $(\tilde{n}_{i+1})$ of the messages to be transmitted in the (i+1)th frame and the number (N) of random access slots. And then, the base station 100 transfers the calculated number $(\tilde{n}_{i+1})$ of messages to be transmitted in the (i+1)th frame and the transmission probability $(p_{i+1}=N/\tilde{n}_{i+1})$ to all the terminals $200_1$-$200_n$ (S202).

The terminals $200_1$-$200_n$ receive the transmission probability $(p_{i+1}=N/\tilde{n}_{i+1})$ and the number $(\tilde{n}_{i+1})$ of messages to be transmitted in the (i+1)th frame, respectively (S203). Thereafter, the terminals $200_1$-$200_n$ determine whether or not the number $(\tilde{n}_{i+1})$ of messages to be transmitted in the (i+1)th frame is greater than the number (N) of random access slots at a contention interval per frame, respectively (S204).

When the number $(\tilde{n}_{i+1})$ of messages to be transmitted in the (i+1)th frame is greater than the number (N) of random access slots at a contention interval per frame according to the determination result in step S204, the terminals $200_1$-$200_n$ extract a random number between 0 and 1, respectively (S205). The terminals $200_1$-$200_n$ determine whether or not it is a random access for an initial accessing the base station 100 (S206). Meanwhile, when the number $(\tilde{n}_{i+1})$ of messages to be transmitted in the (i+1)th frame is smaller than the number (N) of random access slots at the contention interval per frame, all the terminals $200_1$-$200_n$ transmit a random access message, respectively.

In step S206, when it is a random access for an initial accessing the base station 100, the terminals $200_1$-$200_n$ determine whether or not each random number is smaller than the transmission probability $(p_{i+1}=N/\tilde{n}_{i+1})$ (S207).

When each random number is smaller than the transmission probability $(p_{i+1}=N/\tilde{n}_{i+1})$ according to the determination result in step S207, a corresponding terminal transmits a random access message (S208). When each random number is greater than the transmission probability $(p_{i+1}=N/\tilde{n}_{i+1})$, a corresponding terminal holds off transmission of the message until a next frame (S209).

Meanwhile, when it is not a random access for initial accessing the base station 100 according to the determination result in step S206, the terminals $200_1$-$200_n$ calculate a random number value (referred to as a 'class random number', hereinafter) according to each class by multiplying each random number and a service class (w) of each of the terminals $200_1$-$200_n$, respectively, and the processes following step S207 are performed in the same manner as described above by using the calculated class random number (S210).

Figure 3:
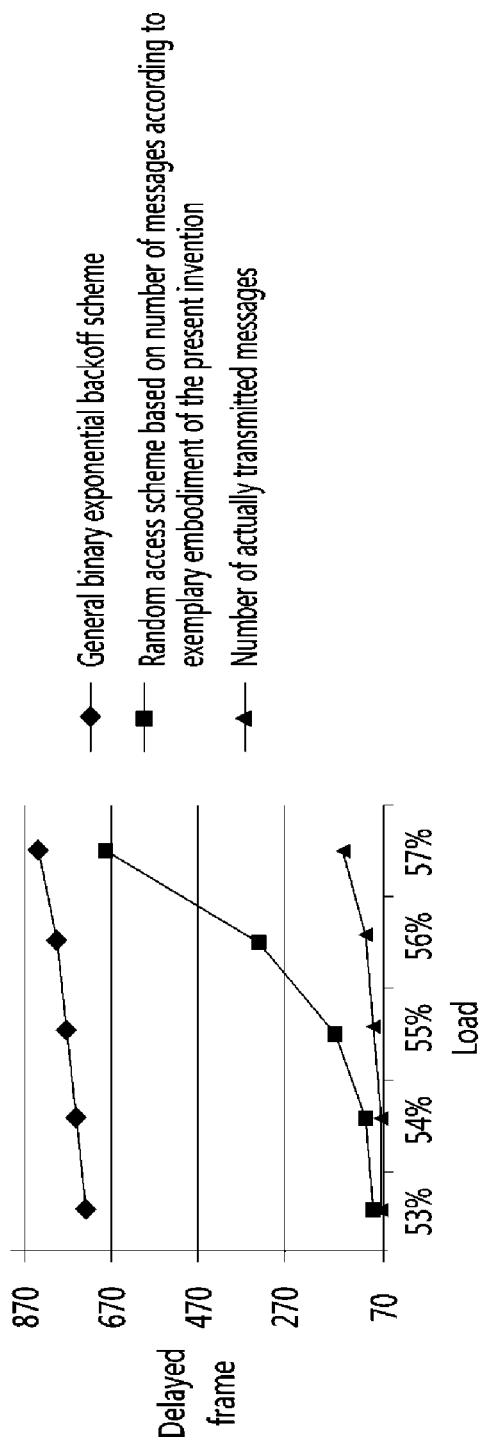
FIG. 3 is a graph showing an example of improving an access delay time by employing a random access scheme according to an exemplary embodiment of the present invention.

According to exemplary embodiments of the present invention, when the estimated number of messages transmitted per frame is greater than the number of allocated random access slots, the terminal extracts a random number and controls a message transmission according to the result obtained by comparing the extracted random number and the transmission probability. Thus, a collision probability of uplink can be reduced, and a terminal access delay due to a collision as shown in FIG. 3 can be also reduced. In addition, after the terminals initially access the base station, respectively, uplink preferential accessing can be discriminately supported by service classes.

According to an exemplary embodiment of the present invention, because the number of uplink random accesses to be requested at a next frame can be estimated and information regarding the number of uplink random accesses imposed on the current uplink is transmitted to terminals, a collision probability of uplink can be reduced, and an access delay of terminals due to a collision can be also reduced.

In addition, according to an exemplary embodiment of the present invention, after terminals initially access a base station, their uplink preferential accessing can be discriminately supported by service classes of the terminals.

The exemplary embodiments of the present invention as described so far are not implemented only through a device or a method but may be implemented through a program that can realize a function corresponding to the configuration of the exemplary embodiments of the present invention or a recording medium storing the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A random access method based on the number of messages of a base station, comprising:
    calculating the number of terminals which have transmitted a message, respectively, in ith frame;
    calculating the number of messages to be transmitted in (i+1)th frame by using the number of terminals which have transmitted the message, respectively, in the ith frame;
    calculating a transmission probability by using the number of messages to be transmitted in the (i+1)th frame and the number of random access slots;
    transmitting the number of messages to be transmitted in the (i+1)th frame and the transmission probability to a plurality of terminals;
    receiving a message transmitted by at least one terminal among the plurality of terminals according to the result obtained by comparing the transmission probability and a random number, when the number of messages to be transmitted in the (i+1)th frame is greater than the number of random access slots per frame; and
    receiving the messages transmitted from the plurality of terminal, when the number of messaged to be transmitted in the (i+1)th frame is smaller than the number of random access slots.

2. The method of claim 1, wherein the calculating of the transmission probability comprises:
    calculating the transmission probability by dividing the number of messages to be transmitted in the (i+1)th frame by the number of random access slots.

3. The method of claim 1, wherein the number of messages to be transmitted in the (i+1)th frame comprises the number of messages which have failed to be transmitted in the ith frame, the number of messages which have been transmitted in the ith frame but the transmission was not successful, and the number of messages which newly arrives in the (i+1)th frame.

4. The method of claim 3, wherein the calculating of the number of messages to be transmitted in the (i+1)th frame comprises:
    calculating the number of messages which have been transmitted in the ith frame but the transmission was not successful by using the number of terminals which have transmitted the messages in the ith frame.

5. The method of claim 1, wherein the random number is extracted from values between 0 and 1.

6. A method for performing random access by a plurality of terminals based on the number of messages, the method comprising:
    receiving the number of messages to be transmitted at (i+1)th frame and a transmission probability calculated by using the number of messages to be transmitted at (i+1)th frame and the number of random access slots per frame from a base station;
    comparing the number of messages to be transmitted in the (i+1)th frame and the number of random access slots;
    when the number of messages to be transmitted in the (i+1)th frame is greater than the number of random access slots, extracting a random number;
    determining whether to transmit the messages according to the result obtained by comparing the random number and the transmission probability; and
    transmitting the messages by the plurality of terminal, respectively, when the number of messages to be transmitted in the (i+1)th frame is smaller than the number of random access slots.

7. The method of claim 6, wherein the determining of whether to transmit the messages comprises:
    determining whether or not it is a random access for initially accessing the base station.

8. The method of claim 7, wherein the determining of whether to transmit the messages further comprises:
    when it is a random access for initial accessing the base station, comparing the random number and the transmission probability;
    when the random number is smaller than the transmission probability, transmitting the messages; and
    when the random number is greater than the transmission probability, holding off transmission of the messages.

9. The method of claim 7, wherein the determining of whether to transmit the messages further comprises:
    when it is not a random access for initialing accessing the base station, calculating a class random number by using the random number and the service class of the corresponding terminal,
    when the class random number is smaller than the transmission probability, transmitting the messages,
    when the class random number is greater than the transmission probability, holding off transmission of the messages.

10. The method of claim 6, wherein the random number is extracted from values between 0 and 1.

* * * * *